(12) United States Patent
Shinagawa

(10) Patent No.: US 11,170,276 B2
(45) Date of Patent: Nov. 9, 2021

(54) COMMUNICATION SYSTEM, NON-TRANSITORY COMPUTER-READABLE STORAGE MEDIUM STORING PROGRAM FOR INFORMATION PROCESSING APPARATUS, AND PRINTER

(71) Applicant: BROTHER KOGYO KABUSHIKI KAISHA, Nagoya (JP)

(72) Inventor: Mina Shinagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/125,279

(22) Filed: Dec. 17, 2020

(65) Prior Publication Data
US 2021/0201096 A1 Jul. 1, 2021

(30) Foreign Application Priority Data
Dec. 26, 2019 (JP) .............................. JP2019-235673

(51) Int. Cl.
*G06K 15/00* (2006.01)
*G06K 15/02* (2006.01)

(52) U.S. Cl.
CPC ..... *G06K 15/1885* (2013.01); *G06K 15/1848* (2013.01); *G06K 15/1894* (2013.01)

(58) Field of Classification Search
CPC .......... G06K 15/1848; G06K 15/1894; G06K 15/1885
See application file for complete search history.

(56) References Cited

U.S. PATENT DOCUMENTS

2005/0157344 A1* 7/2005 Nagashima ........... G06F 40/103
358/1.18
2013/0268894 A1* 10/2013 Jeon .................... G06F 3/04817
715/835

FOREIGN PATENT DOCUMENTS

JP 2006-243388 A 9/2006

* cited by examiner

*Primary Examiner* — Ibrahim Siddo
(74) *Attorney, Agent, or Firm* — Scully, Scott, Murphy & Presser, PC

(57) ABSTRACT

A communication system includes an information processing apparatus and a printer. A controller of the information processing apparatus is configured to receive a layout instruction, generate image data representing a layout image including a first object and a second object, generate edit order data indicating an edit order of the first object and the second object, and send the image data and the edit order data to the printer. A controller of the printer is configured to edit the received image data in accordance with the received edit order data, and activate the printer engine to form the layout image based on the edited image data.

12 Claims, 20 Drawing Sheets

FIG. 20

| 1  | Title of Product name |
|----|----------------------|
| 2  | Product name         |
| 3  | Title of Item name   |
| 4  | Item name            |
| 5  | Title of Ingredients |
| 6  | Ingredients          |
| 7  | Title of Net weight  |
| 8  | Net weight           |
| 9  | Tile of Best by      |
| 10 | Title of Storage     |
| 11 | Storage details      | ns
COMMUNICATION SYSTEM, NON-TRANSITORY COMPUTER-READABLE STORAGE MEDIUM STORING PROGRAM FOR INFORMATION PROCESSING APPARATUS, AND PRINTER

CROSS-REFERENCE TO RELATED APPLICATION

This application claims priority from Japanese Patent Application No. 2019-235673 filed on Dec. 26, 2019, the content of which is incorporated herein by reference in its entirety.

TECHNICAL FIELD

Aspects of the disclosure relate to a communication system, a non-transitory computer-readable storage medium storing a program for generating image data of a layout image where objects are arranged, and a printer.

BACKGROUND

A known communication system includes a printer and an information processing apparatus communicable with the printer. The information processing apparatus is configured to generate image data of a layout image including objects arranged and transfer the image data to the printer to print the layout image based on the image data.

SUMMARY

The layout image including the objects may be edited at the printer. The printer may have a relatively small display. The small display may not be enough to display the objects at once, thereby displaying the objects sequentially in a certain order. One or more aspects of the disclosure are directed to a technique for enhancing an operability of editing an image including a plurality of objects.

According to one or more aspects of the disclosure, a communication system includes an information processing apparatus and a printer. The information processing apparatus includes a first user interface and a first controller. The first controller configured to: receive a layout instruction via the first user interface; generate image data representing a layout image, the layout image having a first object and a second object, the first object having a first attribute and the second object having a second attribute; generate edit order data indicating an edit order of the first object and the second object, the edit order data including a first attribute identification representing the first attribute and a second attribute identification representing the second attribute; and send the image data and the edit order data to the printer. The printer includes a printer engine, a second user interface, and a second controller. The second controller configured to: receive the image data and the edit order data from the information processing apparatus; receive, via the second user interface, an edit instruction to edit the received image data; process editing of the image data in accordance with the received edit order data; and activating the printer engine to form the layout image based on the edited image data.

According to one or more aspects of the disclosure, a non-transitory computer-readable storage medium stores instructions. The instructions, when executed by a controller of an information processing apparatus, cause the information processing apparatus to perform operations. The operations comprising: receiving a layout instruction; generating image data representing a layout image, the layout image having a first object and a second object, the first object having a first attribute and the second object having a second attribute; generating edit order data indicating an edit order of the first object and the second object, the edit order data including a first attribute identification representing the first attribute and a second attribute identification representing the second attribute; and sending the image data and the edit order data.

According one or more aspects of the disclosure, a printer includes a printer engine, a user interface, a communication interface and a controller. The controller configured to: receive, via the communication interface, image data representing a layout image, the layout image having a first object and a second object, the first object having a first attribute and the second object having a second attribute; receive, via the communication interface, edit order data indicating an edit order of the first object and the second object, the edit order data including a first attribute identification representing the first attribute and a second attribute identification representing the second attribute; receive, via the user interface, an edit instruction to edit the received image data; process editing of the image data in accordance with the received edit order data; and activate the printer engine to form the layout image based on the edited image data.

An information processing apparatus and a control method for implementing the above-described program may have novelty and utility. A non-transitory computer-readable storage medium storing a computer program for a printer, or a method performed by the printer may also have novelty and utility.

BRIEF DESCRIPTION OF THE DRAWINGS

FIG. 20 illustrates an example of an attribute table.

DETAILED DESCRIPTION

An illustrative embodiment of the disclosure will be described with reference to drawings. The embodiment described below is merely an example of the disclosure and can be changed as appropriate without departing from the spirit and scope of the disclosure. For example, the sequence of executing steps described below can be changed as appropriate within the scope of the disclosure.

Figure 1:
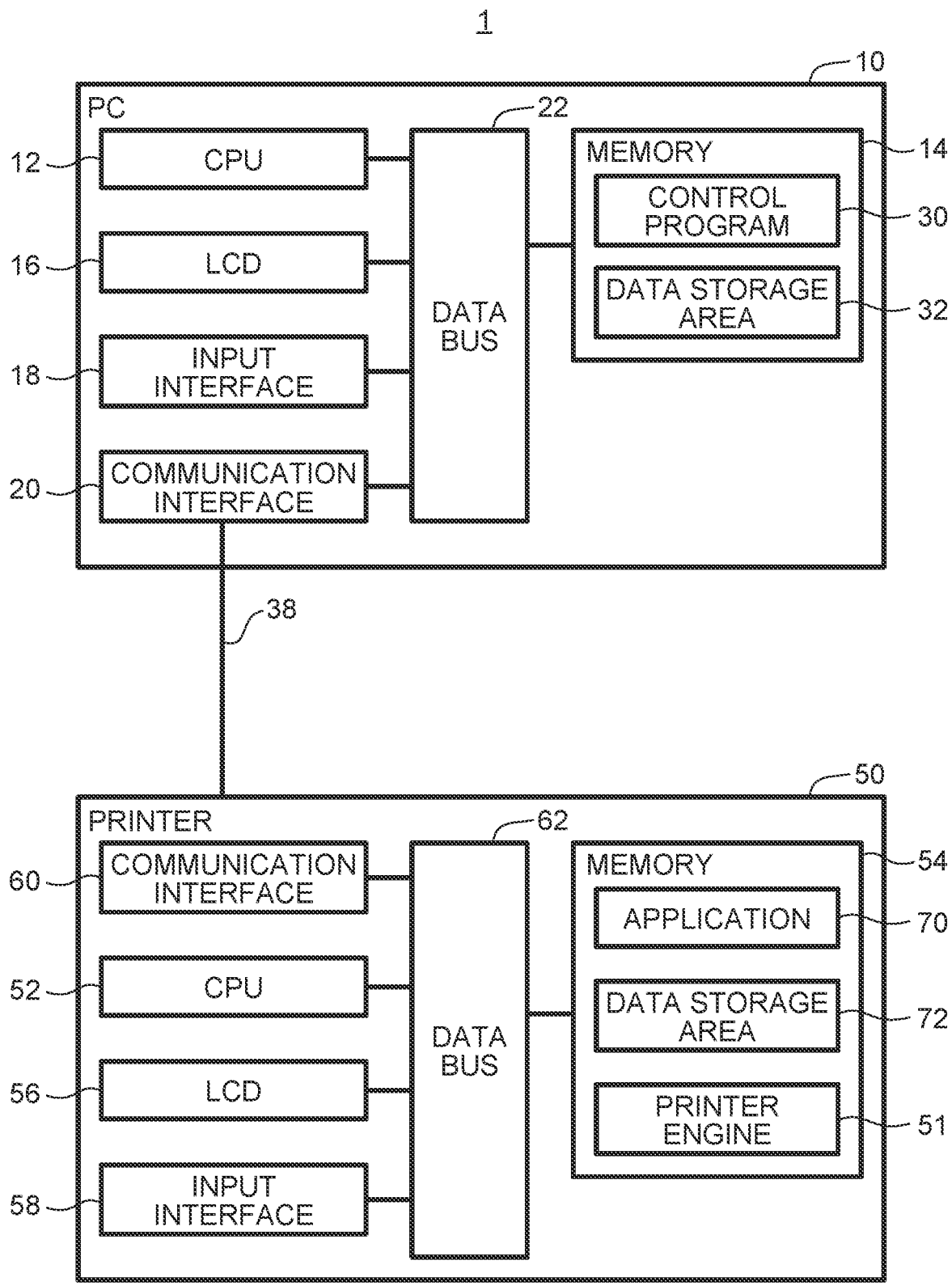
FIG. 1 is block diagram of a printer system.

FIG. 1 is a block diagram of a printer system 1, as an example of a communication system, according to the illustrative embodiment. As illustrated in FIG. 1, the printer system 1 includes a personal computer (PC) 10 as an example of an information processing apparatus, and a printer 50. The PC 10 includes a central processing unit (CPU) 12 as an example of a computer on an apparatus, a memory 14, a liquid crystal display or LCD 16, an input interface 18 as an example of a user interface on the apparatus, and a communication interface 20 as an example of a communication interface on the apparatus, which are communicably connected to one another via a data bus 22.

The CPU 12 executes processing in accordance with a control program 30, as an example of an application program, stored in the memory 14. The control program 30 is an application program, for example, for generating image data of an image to be printed by the printer 50.

The memory 14 includes a data storage area 32. The data storage area 32 is an area for storing data to execute the control program 30. The memory 14 includes random access memory (RAM), read-only memory (ROM), flash memory, a hard disk drive (HDD), a portable storage medium such as a USB flash drive, which is attachable to the PC 10, and a data buffer on the CPU 12.

The LCD 16 as an example of a display displays various information on the PC 10. The display according to the aspects of the disclosure is not limited to the liquid crystal display. The display may be other display such as an organic electroluminescent display (OELD). The input interface 18 includes a mouse and a keyboard, and is an interface for a user to input operations. The communication interface 20 is communicable with an external apparatus, and the PC 10 is communicable with an external apparatus via the communication interface 20 and a communication path 38. As a communication scheme, a wired local area network (LAN), a universal serial bus (USB), Wi-Fi (registered trademark), Bluetooth (registered trademark), or other connection can be used. Wi-Fi is a registered trademark of Wi-Fi Alliance, and Bluetooth is a registered trademark of Bluetooth SIG, INC.

The printer 50 includes a CPU 52 as an example of a computer, a memory 54, an LCD 56, an input interface 58 as an example of a user interface of the printer, a communication interface 60, and a printer engine 51, which are communicably connected to one another via a data bus 62. The printer 50, which is a label printer for example, sends and receives various kinds of information and instruction signals to and from the PC 10, and produces labels on which objects such as desired text or images are printed based on the control by the PC 10.

The CPU 52 executes processing in accordance with an application 70, as an example of a program, which is stored in the memory 54. The application 70 is an application program for editing image data obtained from the PC 10.

The memory 54 includes a data storage area 72. The data storage area 72 is an area for storing data to execute the application 70. The memory 54 includes RAM, ROM, flash memory, a hard disk drive (HDD), a portable storage medium such as a USB flash drive, which is attachable to the printer 50, and a data buffer on the CPU 52.

The memory 54 on the printer 50 and the memory 14 on the PC 10 may be a computer-readable storage medium. A computer-readable storage medium is non-transitory. A non-transitory medium includes a compact disc read-only memory (CD-ROM) and a digital versatile disc read-only memory (DVD-ROM) besides the above example. A non-transitory medium is also tangible.

Figure 4:
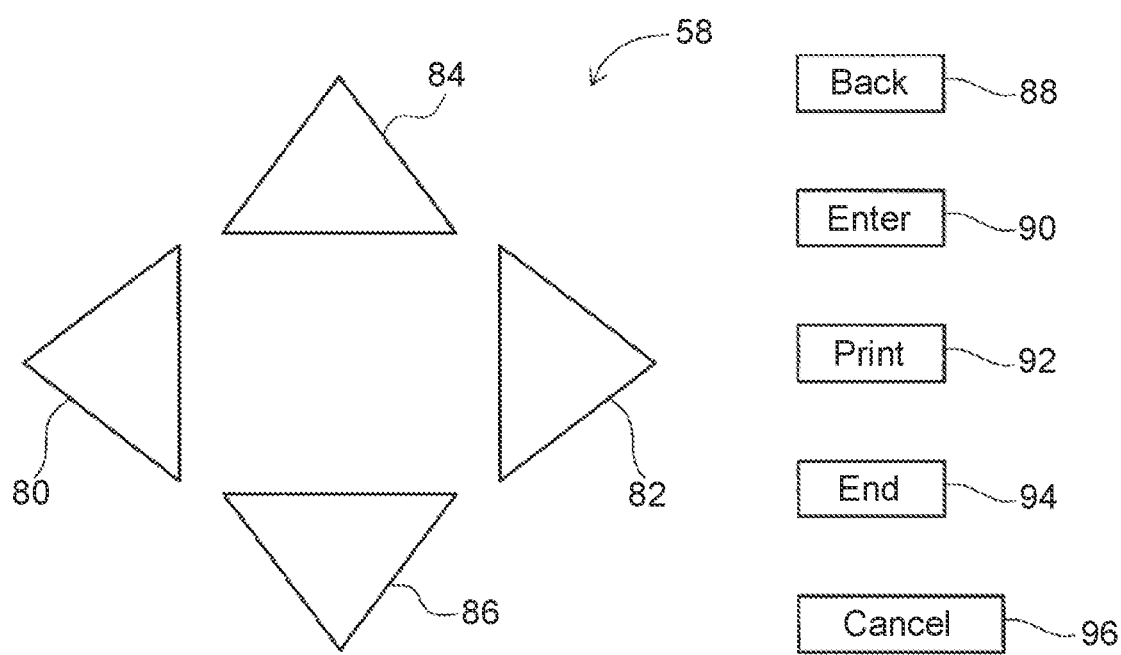
FIG. 4 illustrates an input interface of a printer.

The LCD 56 displays various information on the printer 50. The input interface 58 is an interface for a user to input operations. As illustrated in FIG. 4, the input interface 58 includes a left button 80 as an example of a first operation button, a right button 82 as an example of a second operation button, an up button 84, a down button 86, a Back button 88, an Enter button 90, a Print button 92, an End button 94, and a Cancel button 96. The communication interface 60 is connected via a communication path 38 to the communication interface 20 on the PC 10. This enables the PC 10 and the printer 50 to communicate with each other. The printer engine 51 is configured to execute printing in response to an operation of the Print button 92.

Figure 2:
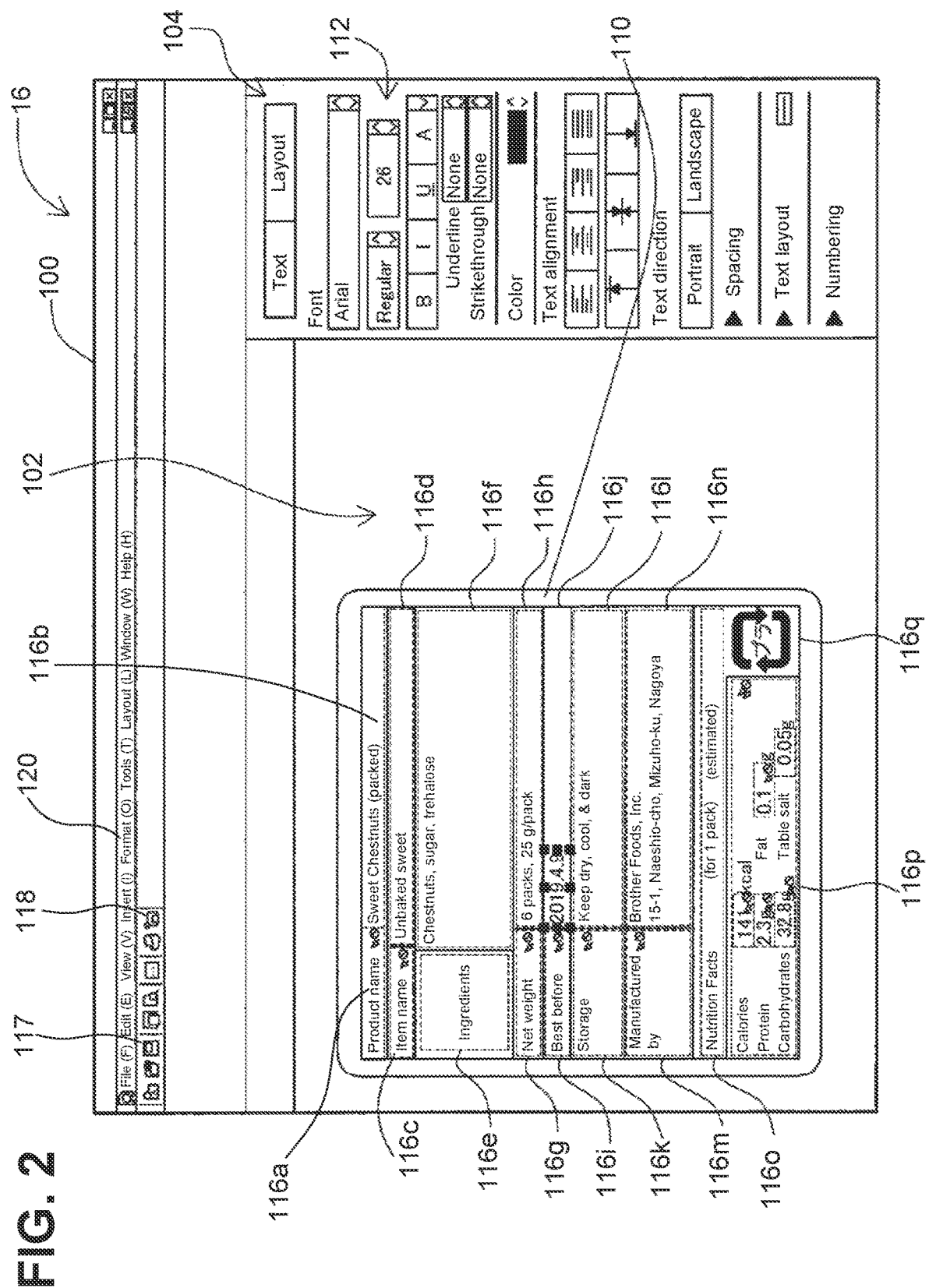
FIG. 2 illustrates an edit screen.

In the printer system 1, the PC 10 is used to edit objects to be printed by the printer 50 on a print medium such as a label. Specifically, the CPU 12 executes the control program 30 to allow the LCD 16 to display an edit screen 100 illustrated in FIG. 2. The edit screen 100 includes an edit area 102 and a setting area 104. The edit area 102, which is used for editing objects, displays a label image 110 corresponding in size to a label to be printed. The setting area 104 displays various edit buttons 112 used for editing objects to be printed on a label. The edit buttons 112 include a button to select an object, and a button to change a display manner of an object. Through the operations of the edit buttons 112 and layout operations of objects, an image where a plurality of objects 116 are arranged (hereinafter referred to as a "layout image") is displayed as a label image 110 as illustrated in FIG. 2. In an example illustrated in FIG. 2, the label image 110 includes 17 objects 116a to 116q, such as a "Product name" object 116a, a "Sweet Chestnuts (packed)" object 116b, an "Item name" object 116c, an "Unbaked sweet" object 116d, and an "Ingredients" object 116e.

Figure 3:
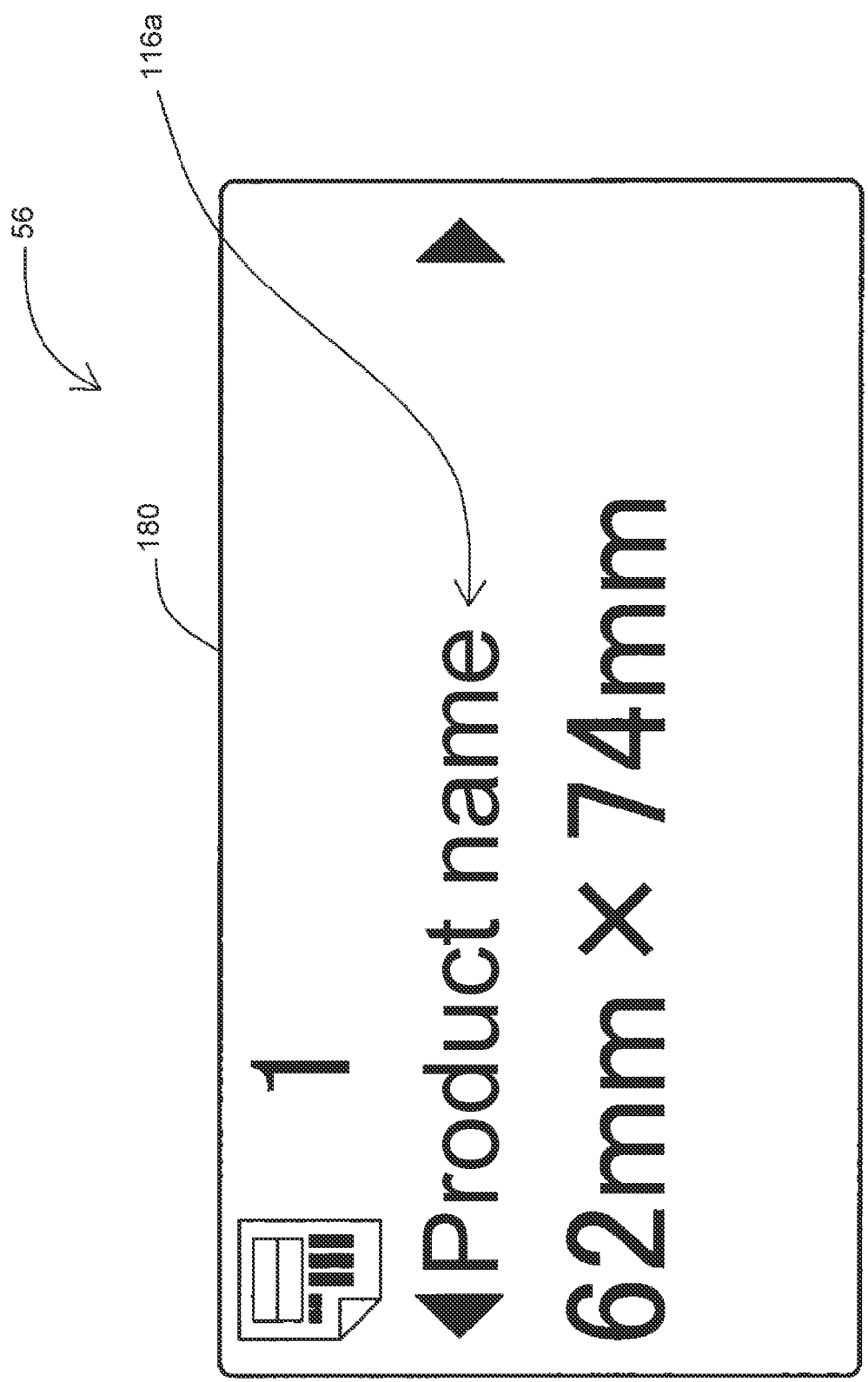
FIG. 3 illustrates a content screen.

At the completion of generation of the layout image, the PC 10 sends image data of the layout image to the printer 50, where the layout image is printed on a label. The printer 50 is capable of editing the layout image based on the image data sent from the PC 10. Specifically, the printer 50 allows the LCD 56 to display the layout image during an edit operation. The LCD 56 of the printer 50 is too small to display the whole layout image at once, and thus displays a single object of the layout image at once. For example, as illustrated in FIG. 3, the LCD 56 displays the "Product name" object 116a. While the "Product name" object 116a is displayed, an edit operation on the "Product name" object 116a is carried out. If a user edits an object other than the object 116a, the user operates the left button 80 and the right button 82 of the input interface 58 to change an object to be displayed on the LCD 56. The user can edit an object by changing a displayed object with the operation of the left button 80 and the right button 82.

The order of changing objects to be displayed on the LCD 56 with the operation of the left button 80 and the right button 82 (hereinafter referred to as a "display changing order") can be set on the PC 10. Specifically, while a layout image is generated on the edit screen 100 displayed on the LCD 16, the display changing order of objects is set on the PC 10 by applying a particular operation to each object constituting the layout image. The set display changing order and image data of the layout image are sent to the printer 50. In editing the layout image, when the left button 80 or the right button 82 is operated, an object displayed on the LCD 56 is changed in accordance with the set displaying order.

Figure 18:
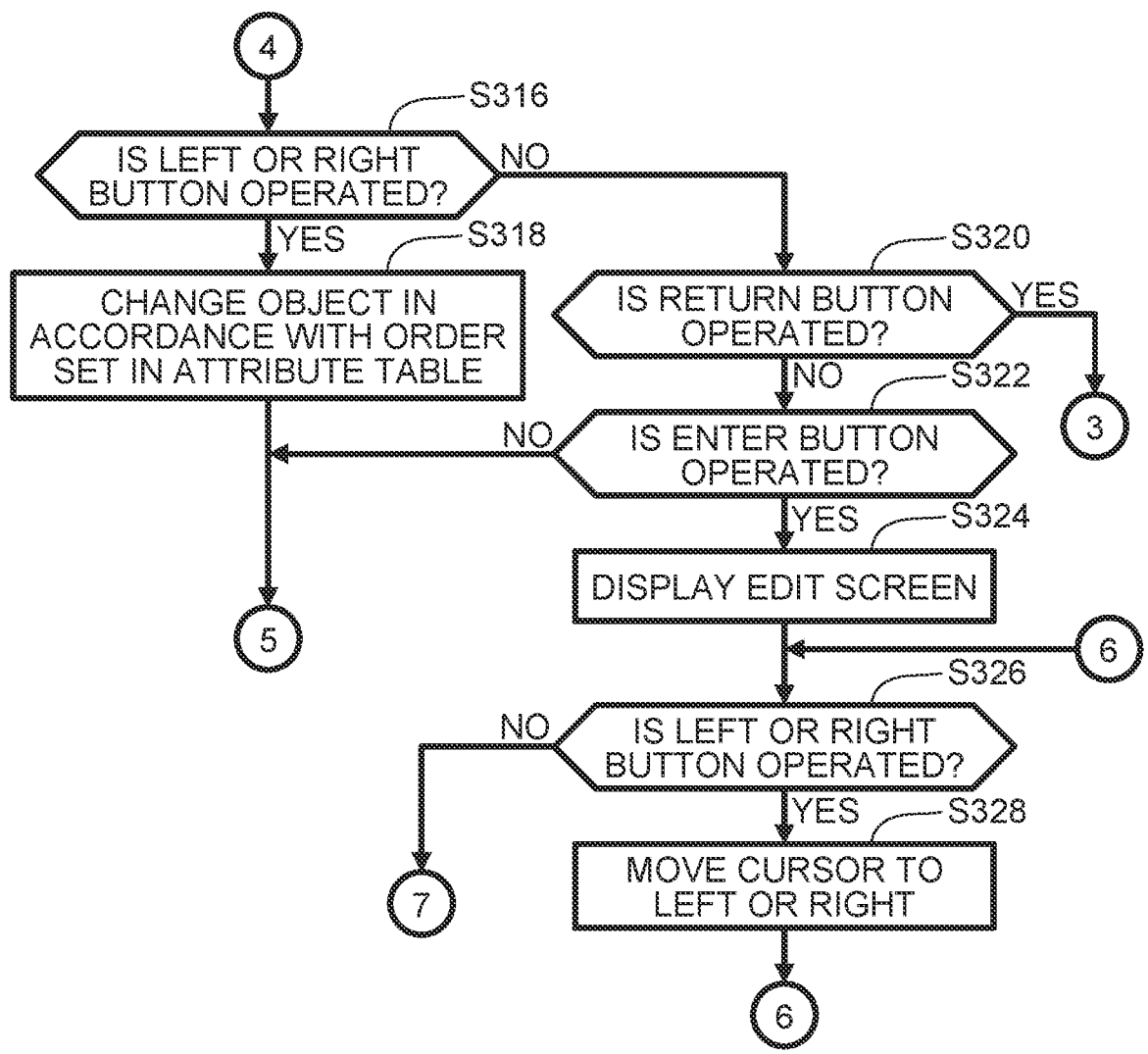
FIG. 18 is a flowchart of the application.
Figure 19:
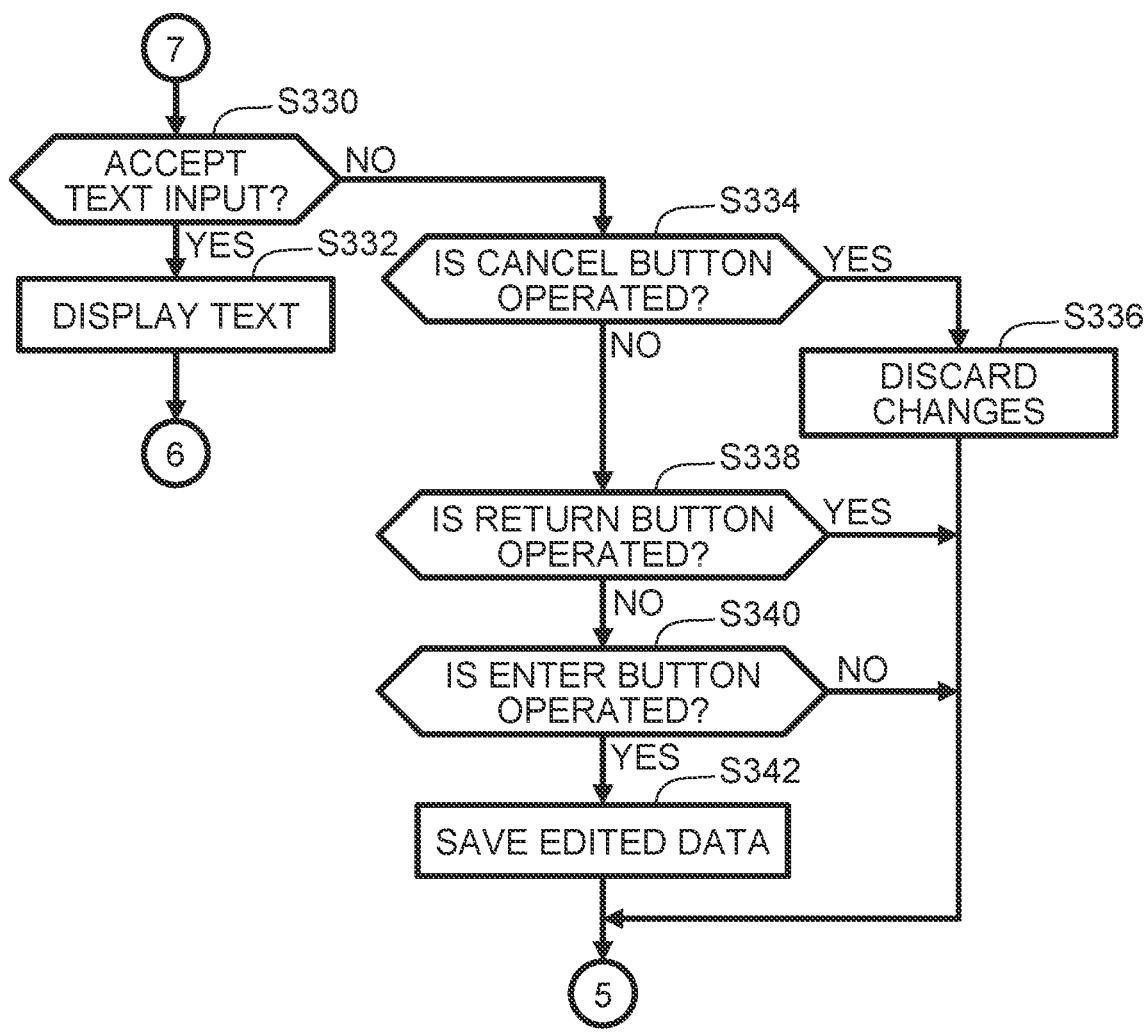
FIG. 19 is a flowchart of the application.

However, the display changing order is to be set on the PC 10 newly for every layout image, which imposes a burden on the user. To reduce a burden on the user, the control program 30 is executed on the PC 10 to generate a table indicating a display changing order. The table, which is applicable to multiple layout images, is sent to the printer 50 with image data of a layout image to which the table is applied. The application 70 is executed on the printer 50 to refer to the table to identify a display changing order of objects constituting the layout image, and thus an object displayed on the LCD 56 is changed in accordance with the display changing order. This lightens the workload of the user who would otherwise set a display changing order newly for every layout image. In the following, processes of the control program 30 to generate a table indicating a display changing order will be described with reference to FIGS. 12 to 16, and processes of the application 70 to use the table to change objects to be displayed on the LCD 56 will be described with reference to FIGS. 17 to 19.

Figure 5:
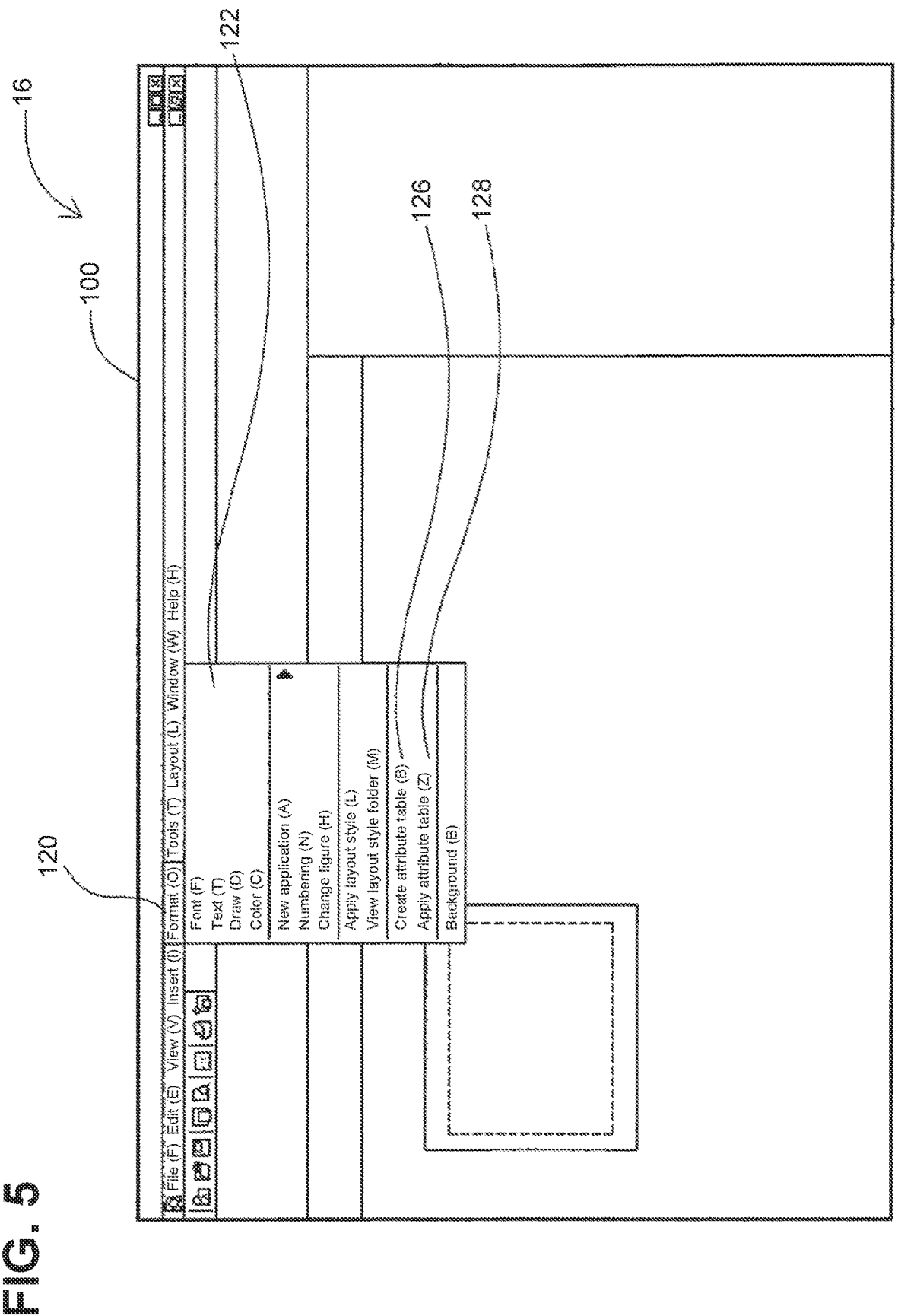
FIG. 5 illustrates an edit screen.
Figure 12:
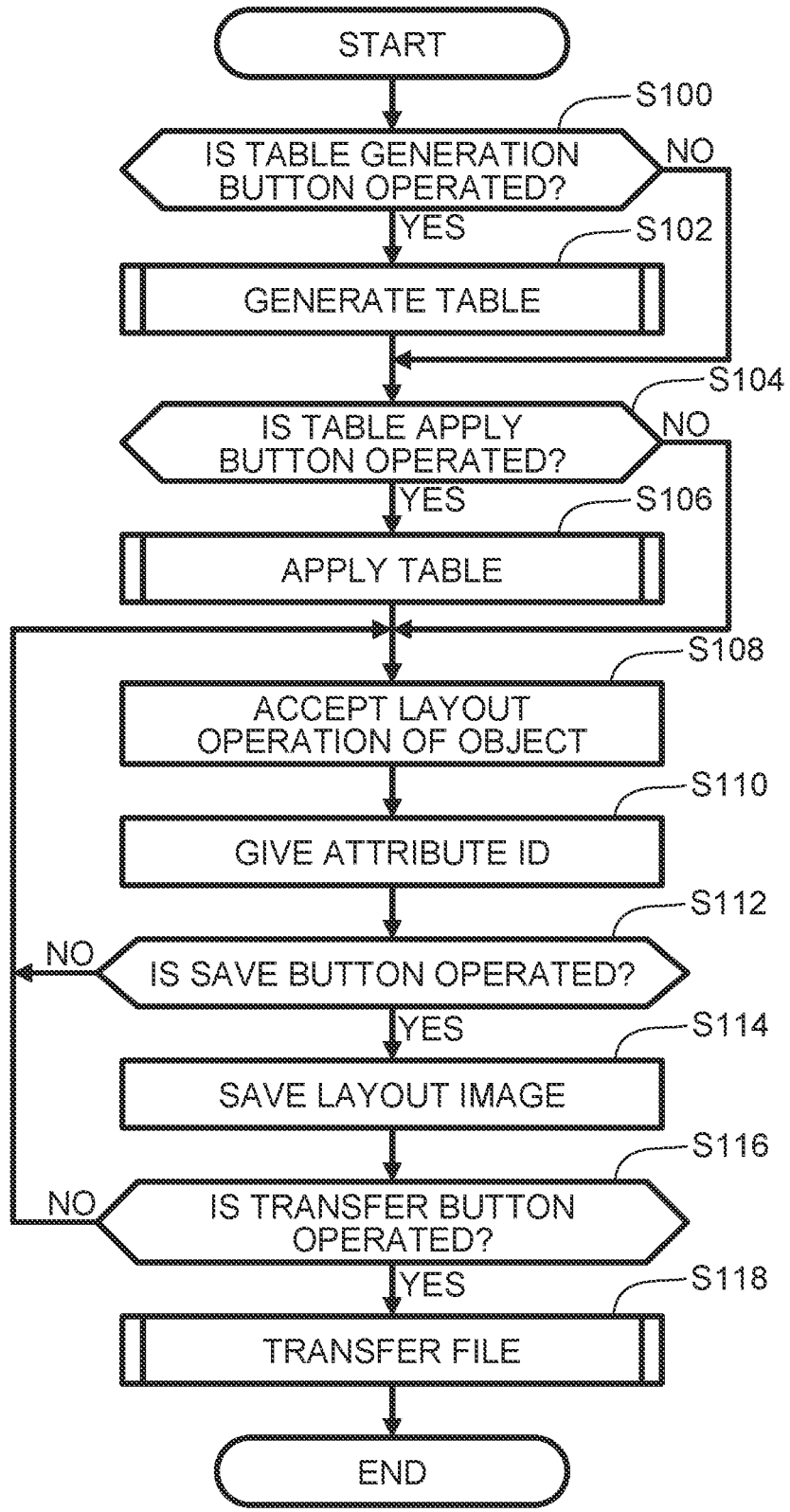
FIG. 12 is a flowchart of a control program.
Figure 13:
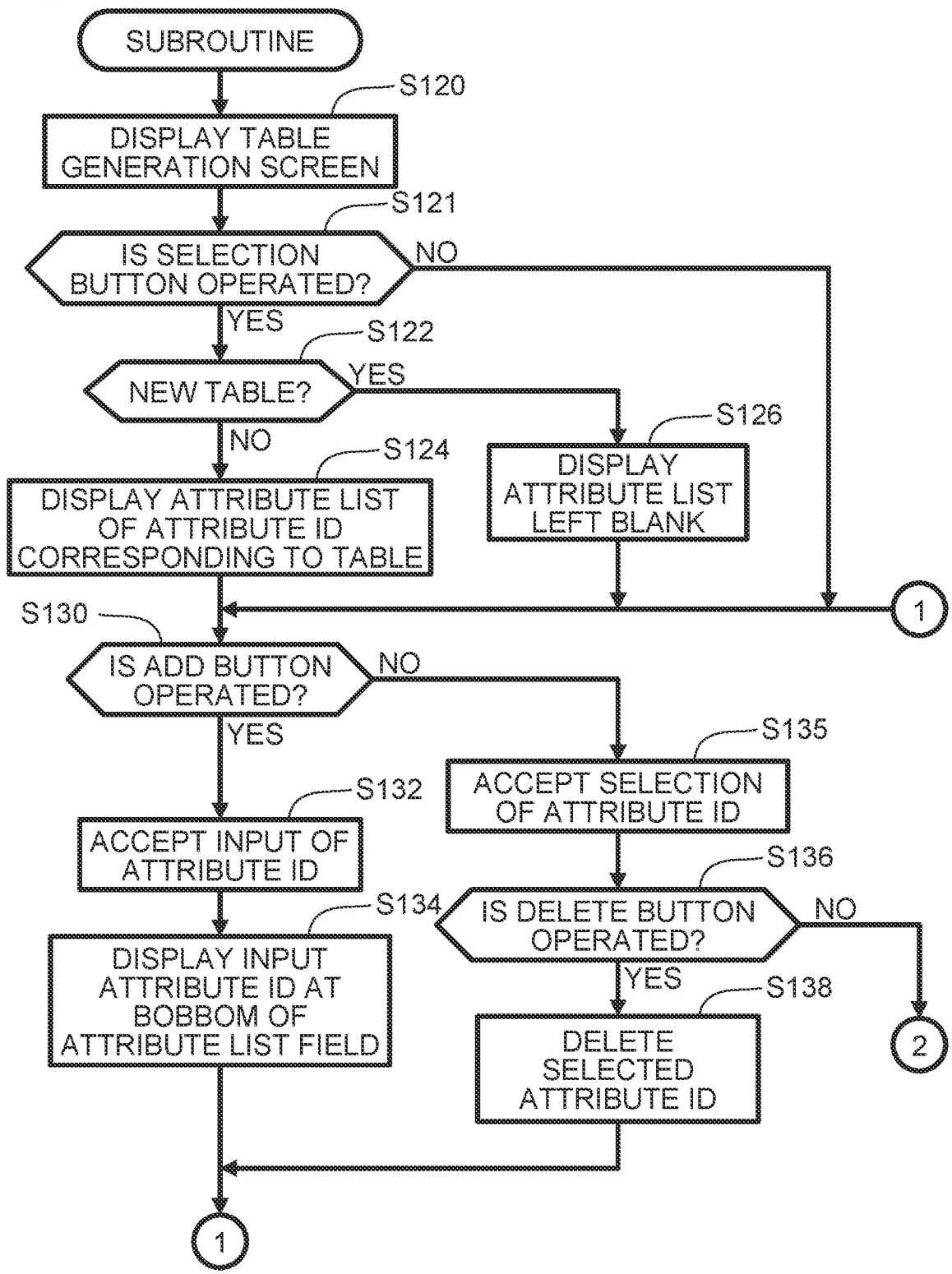
FIG. 13 is a flowchart of the control program.
Figure 14:
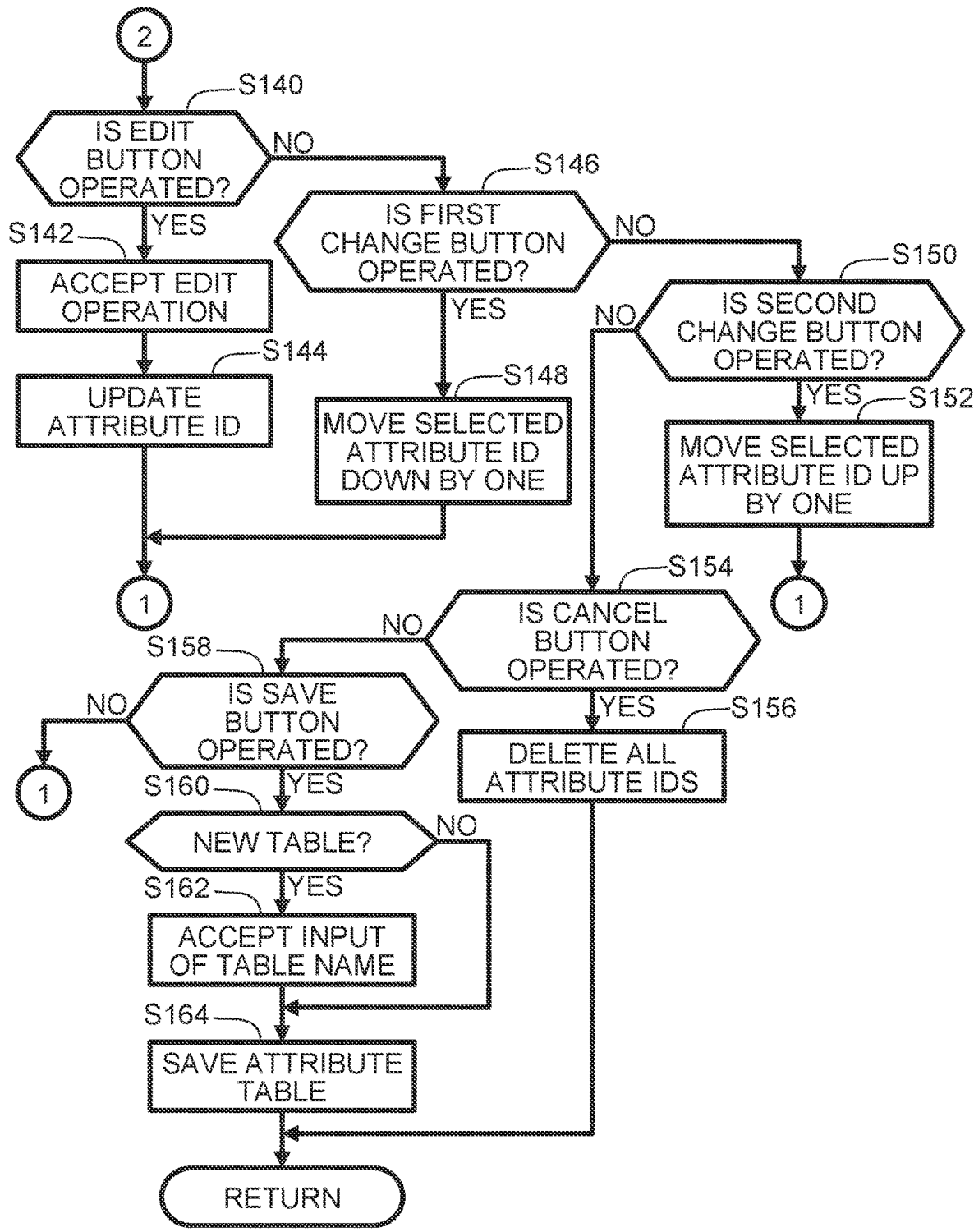
FIG. 14 is a flowchart of the control program.
Figure 15:
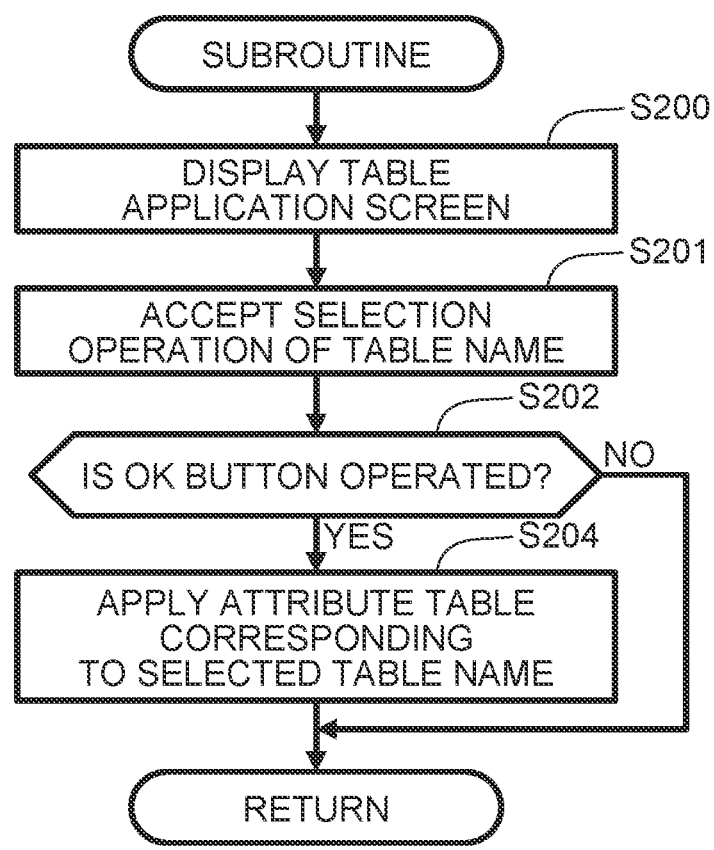
FIG. 15 is a flowchart of the control program.
Figure 16:
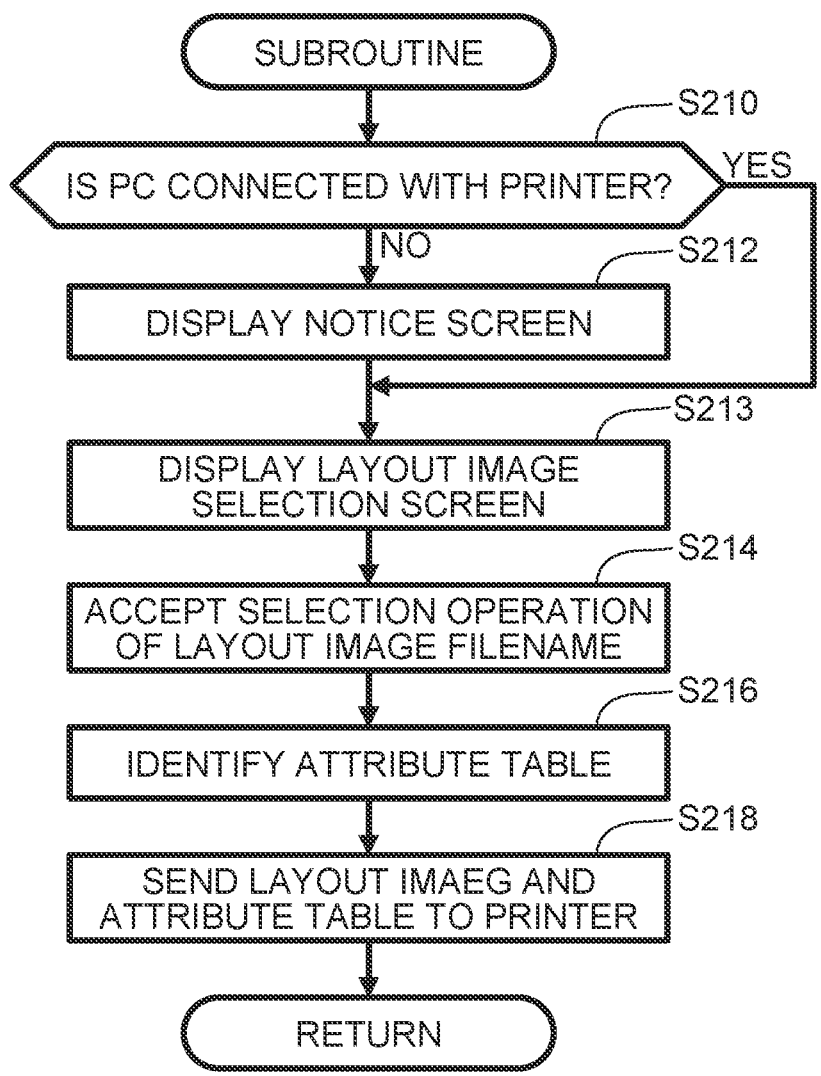
FIG. 16 is a flowchart of the control program.

FIG. 12 illustrates main process executed by the PC 10 that starts in response to operation of a table generation button 126. The CPU 12 determines whether the table generation button 126 is operated (S100). Specifically, as illustrated in FIG. 5, when the Format button 120 is operated on the edit screen 100, a drop-down list 122 including a table generation button 126 appears. In response to an operation of the table generation button 126 (S100: YES), the CPU 12 executes a table generation subroutine (S102). In the table generation subroutine illustrated in FIG. 13, the CPU 12 allows the LCD 16 to display a table generation screen 130 (S120).

Figure 6:
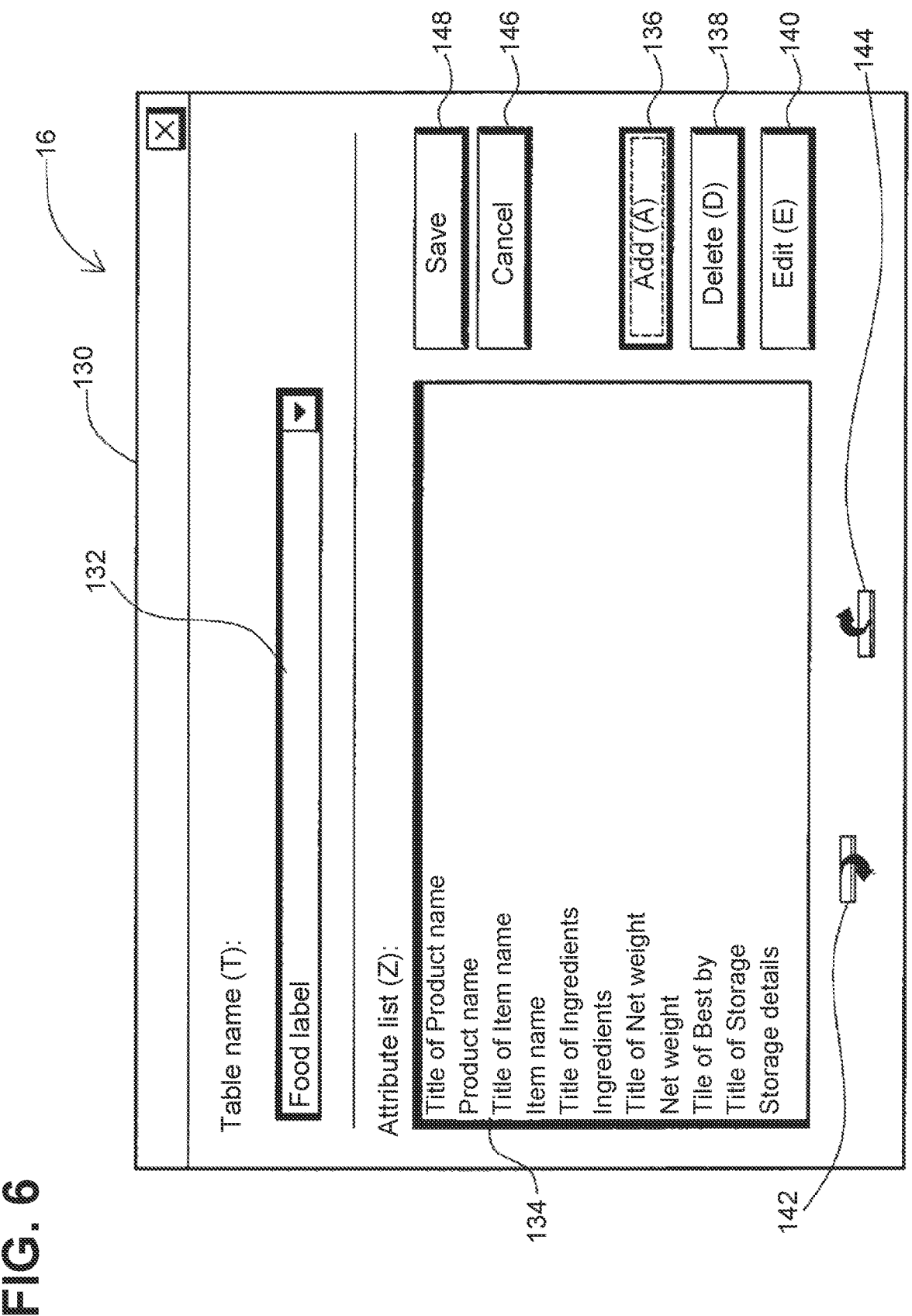
FIG. 6 illustrates a table generation screen.

As illustrated in FIG. 6, a table generation screen 130 displays a table name field 132 and an attribute list field 134. In response to an operation of the table name list field 132, a drop-down list appears. The drop-down list shows selection buttons of registered table names and a selection button for creation of a new table.

Figure 7:
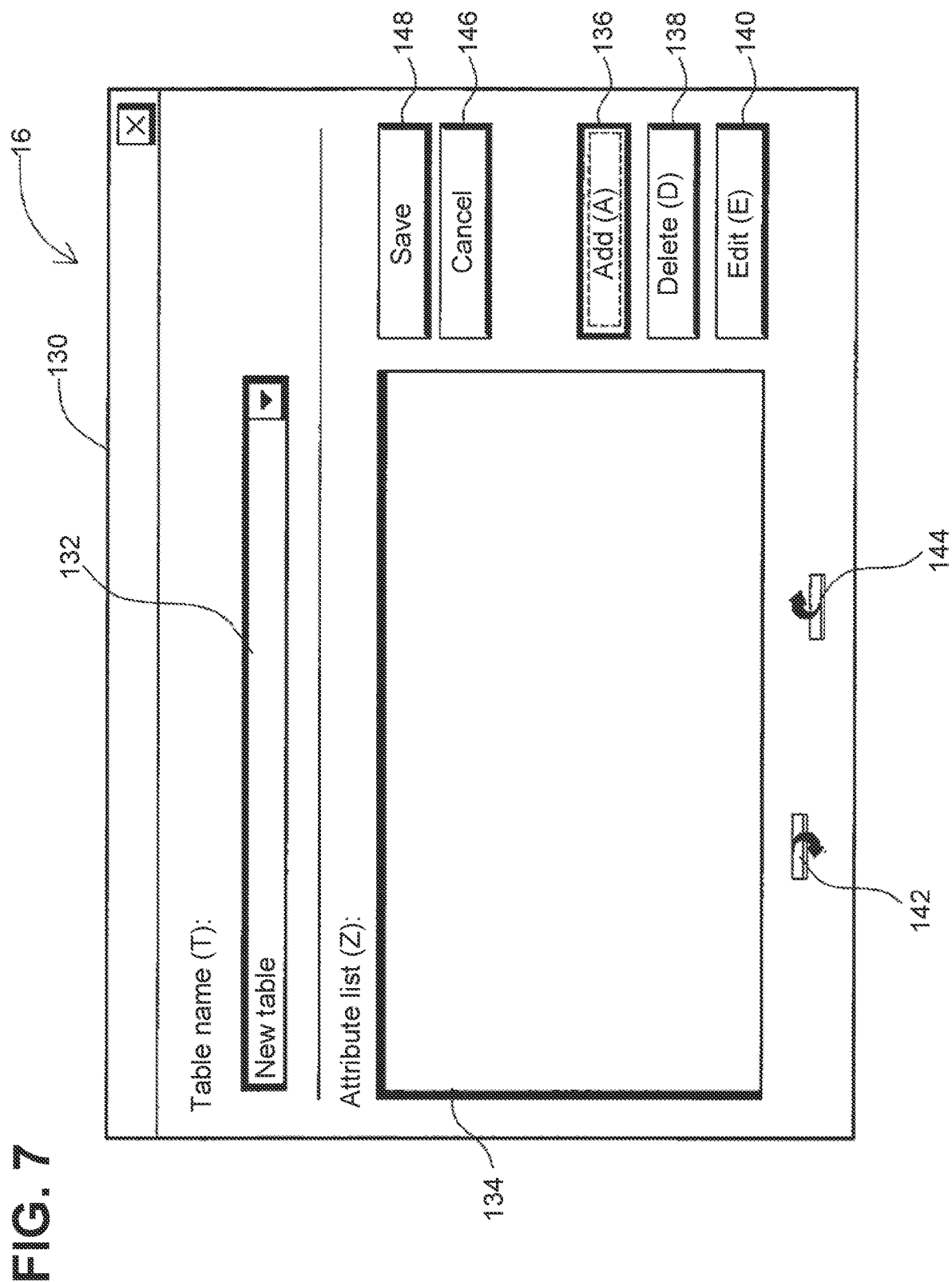
FIG. 7 illustrates a table generation screen.

In response to an operation of one of the selection buttons (S121: YES), the CPU 12 determines whether the selection button for creation of a new table has been operated (S122). When the selection button for creation of a new table has been operated (S122: YES), the CPU 12 displays the attribute list field 134 left blank as illustrated in FIG. 7 (S126). The attribute list field 134 is for showing a list of attribute IDs (as an example of attribute data). An attribute ID is identification information to identify an object constituting a layout image. In other words, an attribute ID defines a property of an object constituting a layout image. In an example of the layout image illustrated in FIG. 2, an attribute ID of the "Product name" object 116a is "Title of Product name", an attribute ID of the "Sweet Chestnuts (packed)" object 116b is "Product name", an attribute ID of the "Item name" object 116c is "Title of Item name", and an attribute ID of the "Unbaked sweet" object 116d is "Item name".

The attribute list field 134 is for setting the order in which attribute IDs appear in the attribute list field 134. In accordance with the order of the attribute IDs in the attribute list field 134 inputted by a user, the order of the objects each identified by a corresponding attribute ID is set. In an example illustrated in FIG. 6, when attribute IDs are input in the order of "Title of Product name", "Product name" "Title of Item name", and "Item name", the objects are set in the order of the "Product name" object 116a, the "Sweet Chestnuts (packed)" object 116b, the "Item name" object 116c, and the "Unbaked sweet" object 116d. The order of the objects set here becomes a display changing order in which the objects are to be displayed sequentially one by one on the LCD 56 of the printer 50. An object listed higher in the attribute list field 134 is displayed earlier, in response to the right button 82 being input, on the LCD 56 of the printer 50.

When the Add button 136 is operated on the table generation screen 130, an attribute ID is input in the attribute list field 134. The CPU 12 determines whether the Add button 136 has been operated (S130). In response to a determination that the Add button 136 has been operated (S130: YES), the CPU 12 accepts an input of an attribute ID (S132). In other words, the CPU 12 accepts text data of an attribute ID input by a user through a keyboard of the input interface 18. The CPU 12 displays the attribute ID based on the input text data at the bottom of the attribute list field 134 (S134). A plurality of attribute IDs can be input in the attribute list field 134 by repeating steps S130 to S134. In this case, a first attribute ID having been input is displayed at the top of the attribute list field 134, and second or later attribute IDs are each displayed below its previous attribute ID having been input.

The attribute IDs can be deleted from the attribute list field 134. Specifically, an attribute ID selected in the attribute list field 134 can be deleted therefrom by operation of a Delete button 138 on the table generation screen 130. The CPU 12 accepts a selection operation for selecting an attribute ID in the attribute list field 134 (S135). The CPU 12 determines whether the Delete button 138 has been operated (S136). When the Delete button 138 has been operated (S136: YES), the CPU 12 deletes the selected attribute ID from the attribute list field 134 (S138).

The attribute IDs having been input in the attribute list field 134 can be edited. Specifically, an attribute ID selected in the attribute list field 134 is editable by operation of an Edit button 140 on the table generation screen 130. The CPU 12 determines whether the Edit button 140 has been operated (S140). When the Edit button 140 has been operated (S140: YES), the CPU 12 accepts an edit operation via the keyboard of the input interface 18 (S142). The CPU 12 updates the attribute ID selected at S135 in accordance with the edit operation (S144).

The sequence of the attribute IDs in the attribute list field 134 is changeable. Specifically, the table generation screen 130 includes a first change button 142 for changing displayed places of a selected attribute ID and its following attribute ID, and a second change button 144 for changing displayed places of a selected attribute ID and its preceding attribute ID. The CPU 12 determines whether the first change button 142 has been operated (S146). In response to a determination that the first change button 142 has been operated (S146: YES), the CPU 12 changes displayed places of the attribute ID selected at S135 and its following attribute ID (S148). As illustrated in FIG. 6, attribute IDs are displayed in the attribute list field 134. For example, when an attribute ID "Title of Item name" is selected and the first change button 142 is operated, the attribute ID "Title of Item name" and its following attribute ID "Item name" change places. That is, the places of the attribute ID "Title of Item name" and the attribute ID "Item name" switch. The CPU 12 determines whether the second change button 144 has been operated (S150). In response to a determination that the second change button 144 has been operated (S150: YES), the CPU 12 changes displayed places of the attribute ID selected at S135 and its preceding attribute ID (S152). As illustrated in FIG. 6, attribute IDs are displayed in the attribute list field 134. For example, when the attribute ID "Title of Item name" is selected and the second change button 144 is operated, the attribute ID "Title of Item name" and its preceding attribute ID "Product name" change places. That is, the places of the attribute ID "Title of Item name" and the attribute ID "Product name" switch.

The table generation screen 130 further displays a Cancel button 146. The Cancel button 146 is operated to cancel the current editing, thereby delete all attribute IDs displayed in the attribute list field 134. The CPU 12 determines whether the Cancel button 146 has been operated (S154). In response to a determination that the Cancel button 146 has been operated (S154: YES), the CPU 12 deletes all attribute IDs in the attribute list field 134 (S156).

The table generation screen 130 further displays a Save button 148. The Save button 148 is operated to save attribute IDs having been input in the attribute list field 134 in the data storage area 32 as an attribute table (as an example of edit order data). FIG. 20 illustrates an example of the attribute table indicating a display changing order. The table includes a first column and a second column. The first column includes a plurality of ordinal numbers. The second column includes a plurality of attribute IDs each corresponding to one of the plurality of ordinal numbers. In a case where a new attribute table is generated, a new table name of the attribute table is input, and the attribute table with the input table name is stored in the data storage area 32. The CPU 12 determines whether the Save button 148 has been operated (S158). In response to a determination that the Save button 148 has been operated (S158: YES), the CPU 12 determines whether the current process is for generation of a new attribute table (S160). When the current process is for generation of a new attribute table (S160: YES), the CPU 12 accepts an input of the table name (S162). In other words, the CPU 12 accepts text data of the table name input through the keyboard of the input interface 18. The CPU 12 saves the attribute table with the input table name in the data storage area 32 (S164). The attribute table newly generated is registered in this manner.

Upon registration of the attribute table, a selection button having the table name of the registered attribute table appears in a drop-down list to be developed during operation of the table name field 132. When the selection button having the table name has been operated (S122: NO), the attribute IDs of the attribute table with the table name are displayed in the order set in the attribute table in the attribute list field 134 (S124). The registered attribute table can be changed through the buttons such as the Add button 136 and the Delete button 138. In response to an operation of the Save button 148 (S158: YES), the changed attribute table is registered again (S164). In this case, as the attributed table is no longer a new table (S160: NO), a step S162 is skipped, and the attribute table is saved with the file name selected at S121.

When the attribute table is registered, the table generation subroutine ends. As illustrated in FIG. 12, the CPU 12 determines whether a table application button 128 is operated (S104). Specifically, when the Format button 120 is operated on the edit screen 100, the drop-down list 122 (refer to FIG. 5) including a table application button 128 appears. In response to an operation of the table application button 128 (S104: YES), the CPU 12 executes a table application subroutine (S106). In the table application subroutine illustrated in FIG. 15, the CPU 12 allows the LCD 16 to display a table application screen 150 (S200).

Figure 8:
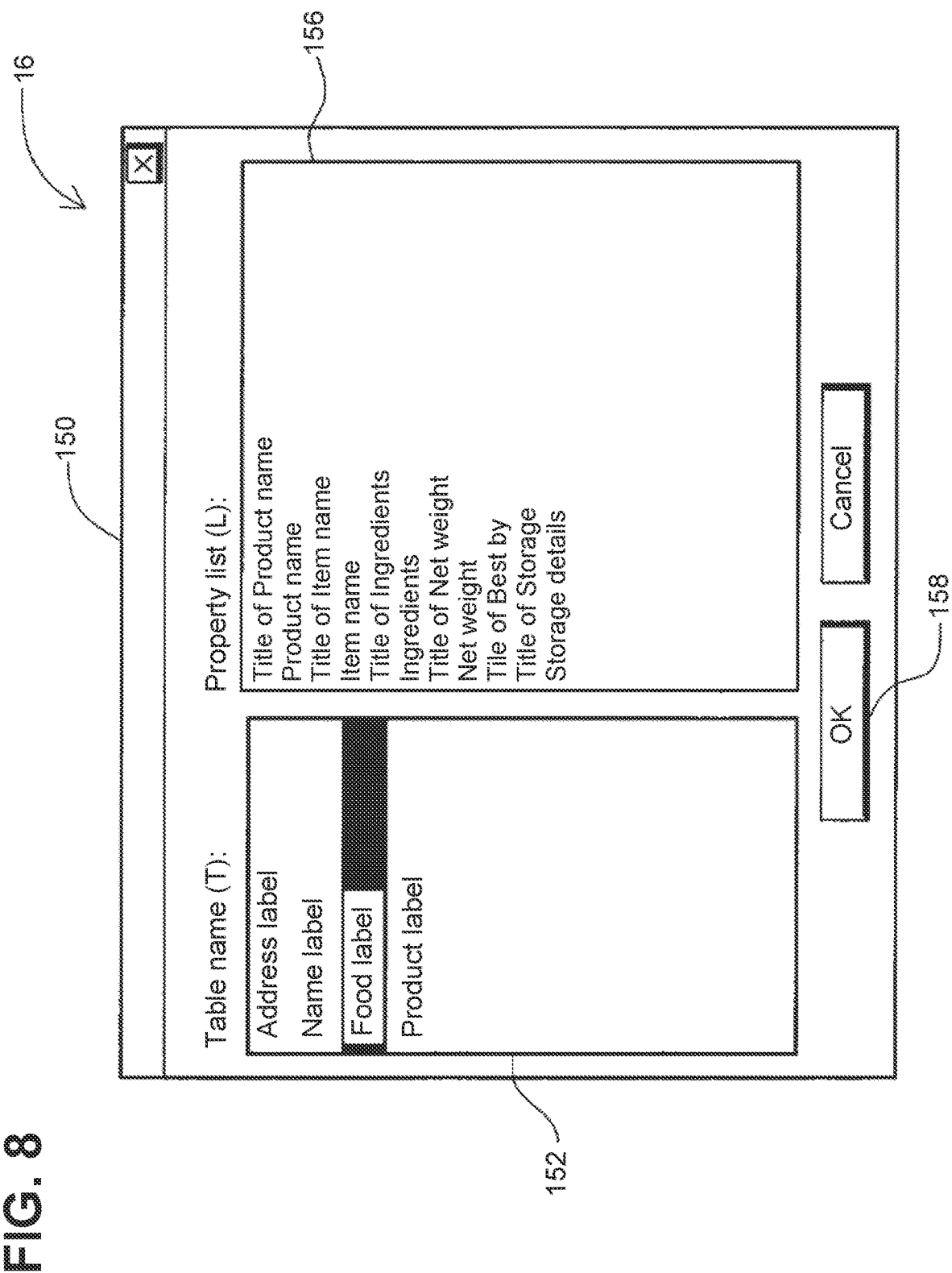
FIG. 8 illustrates a table application screen.

As illustrated in FIG. 8, a table application screen 150 displays a table name field 152 and an attribute table field 156. The table name field 152 shows selectable table names of all attribute tables stored in the data storage area 32. The CPU 12 accepts a selection operation for selecting one of table names displayed in the table name field 152 (S201). For example, when a table name "Food label" is selected, attribute IDs included in an attribute table having the table name "Food label" are displayed in the attribute table field 156 in the order set in the attribute table. This allows the user to check contents of the attribute table having the table name selected by the user. In response to an operation of the OK button 158 on the table application screen 150 (S202: YES), the CPU 12 applies the attribute table corresponding to the selected table name to the layout image (S204), thereby the attribute table and the image data of the layout image are associated with each other. This ends the table application subroutine.

As illustrated in FIG. 12, the CPU 12 then accepts a layout operation of an object (S108). In other words, the CPU 12 accepts operations on the edit screen 100 (refer to FIG. 2), such as an operation of any of the edit buttons 112 in the setting area 104 and a layout operation of an object in a label image 110 displayed in the edit area 102. When an object is arranged, the CPU 12 gives an attribute ID to the object (S110). For example, when the "Product name" object 116*a* is arranged, the CPU 12 gives the "Product name" object 116*a* an attribute ID "Title of Product name". The objects 116 are arranged in the label image 110 by repeating steps S108 and S110, thereby generating image data of the layout image. Every object in the generated layout image is associated with a corresponding attribute ID given at S110. In response to an operation of a save icon 117 on the edit screen 100 (S112: YES), the CPU 12 saves generated image data of the layout image in the data storage area 32 (S114). At this time, the CPU 12 accepts an input operation of a filename of the layout image, and saves the image data of the layout image with the filename.

In response to an operation of a transfer icon 118 on the edit screen 100 (S116: YES), the CPU 12 executes a file transfer subroutine (S118). In the file transfer subroutine illustrated in FIG. 16, the CPU 12 determines whether the PC 10 is connected with the printer 50 (S210). When the PC 10 is not connected with the printer 50 (S210: NO), the CPU 12 allows the LCD 16 to display a notice screen (S212). The notice screen displays a message prompting connection with the printer 50.

When the PC 10 is connected with the printer 50 (S210: YES), the CPU 12 allows the LCD 16 to display a layout image selection screen for selecting a layout image to be sent to the printer 50 (S213). The layout image selection screen displays selectable filenames of layout images stored in the data storage area 32. The CPU 12 thus accepts a selection operation for selecting one of the filenames displayed on the layout image selection screen (S214). A layout image to be sent to the printer 50 is selected in this manner. Subsequently, the CPU 12 identifies an attribute table applied to the layout image (S216). Specifically, the CPU 12 identifies the attribute table applied at S204 of the table application subroutine. The CPU 12 sends image data of the selected layout image and the attribute table applied to the layout image to the printer 50. This ends the file transfer subroutine and processing by the CPU 12.

Figure 9:
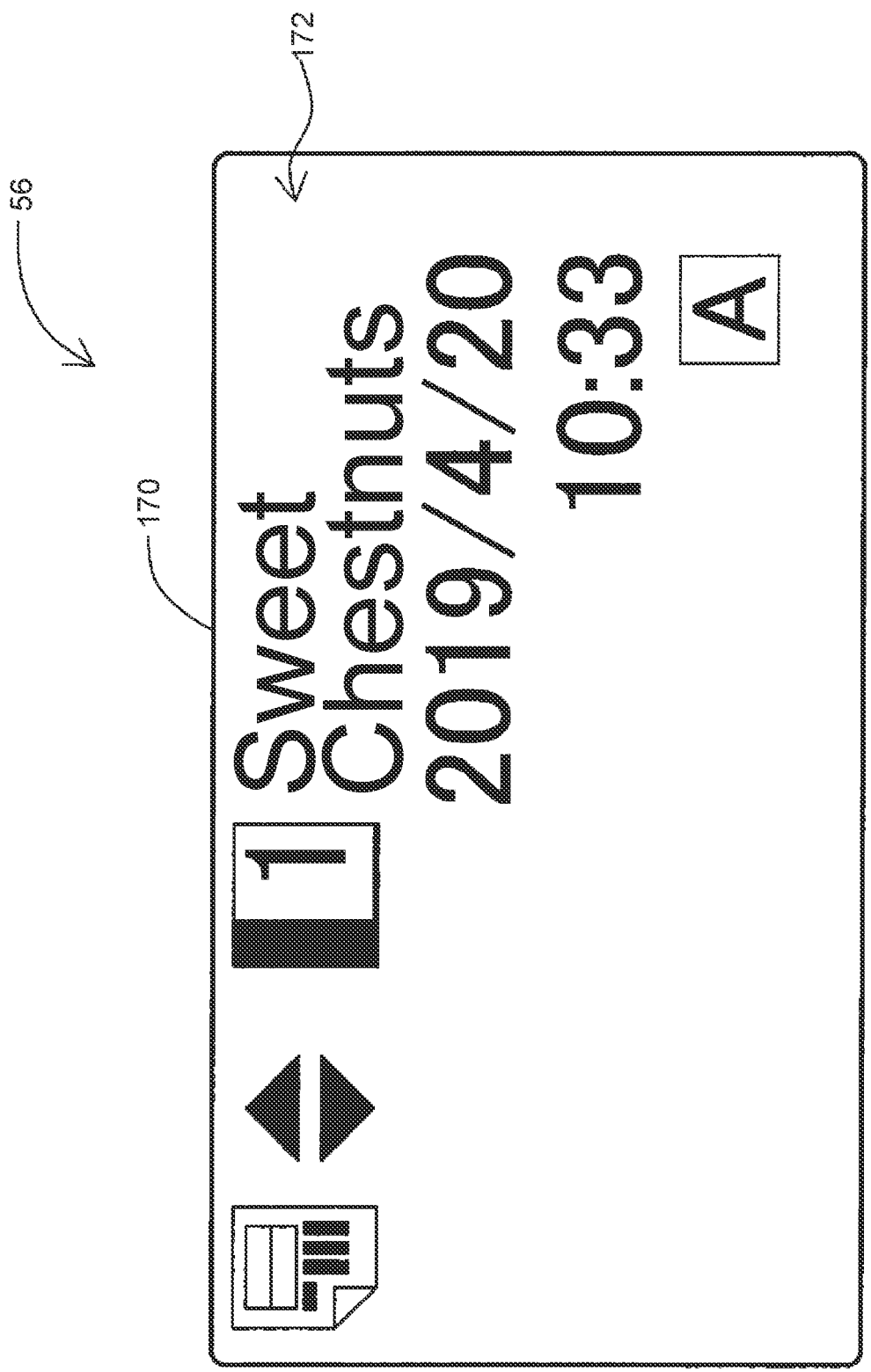
FIG. 9 illustrates a main screen.
Figure 17:
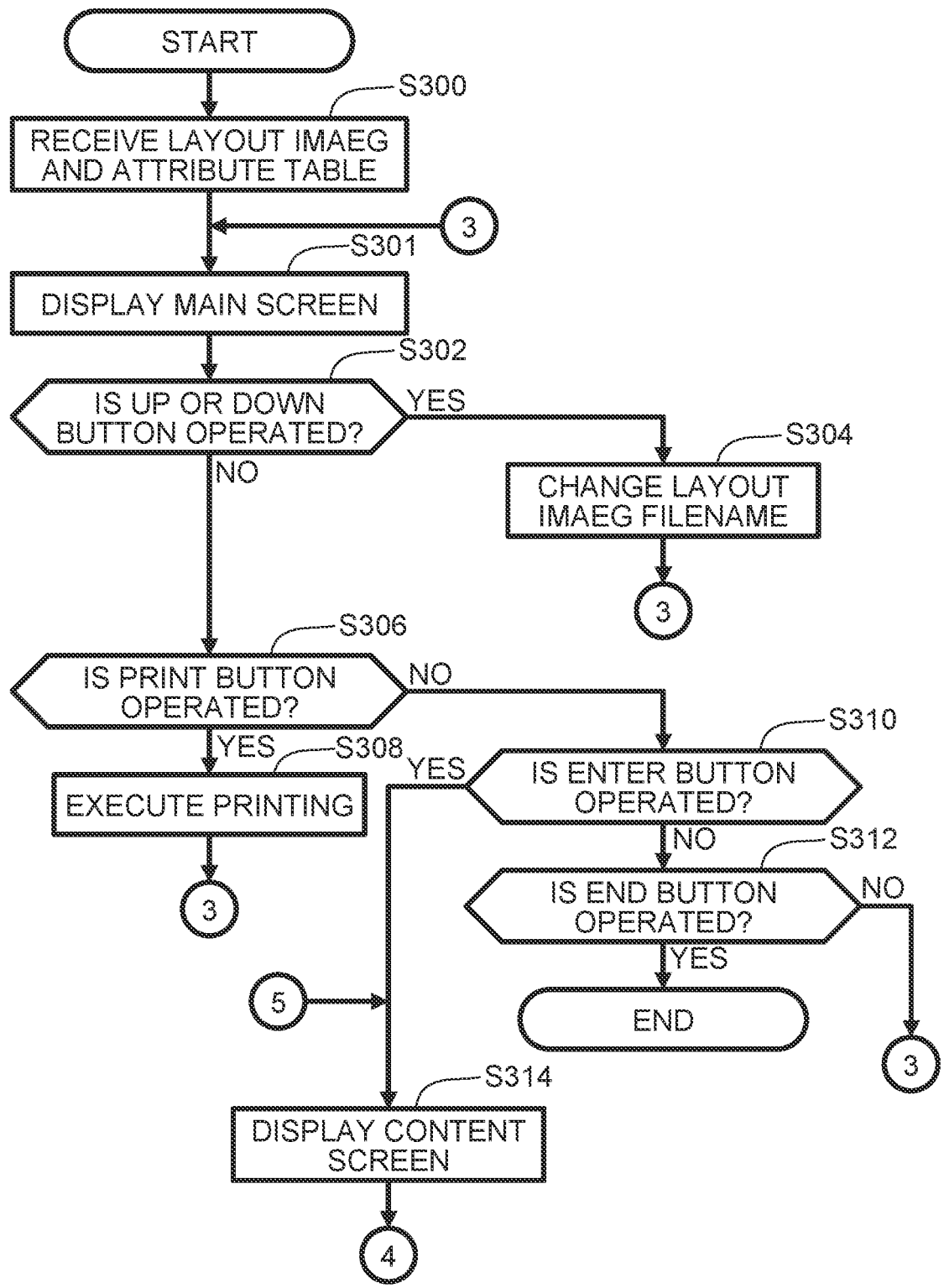
FIG. 17 is a flowchart of an application.

FIG. 17 illustrates main process executed by the printer 50. The CPU 52 of the printer 50 receives the image data of the layout image and the attribute table sent from the PC 10 (S300). The CPU 52 allows the LCD 56 to display a main screen 170 (refer to FIG. 9) (S301). As illustrated in FIG. 9, the main screen 170 displays a filename 172 of the layout image sent from the PC 10. For multiple layout images sent from the PC 10, their filenames are cyclically displayed on the main screen 170 with the operation of the up or down button 84, 86 (refer to FIG. 4) of the input interface 58. The CPU 52 determines whether the up or down button 84, 86 has been operated (S302). In response to a determination that the up or down button 84, 86 has been operated (S302: YES), the CPU 52 changes a filename 172 displayed on the main screen 170 (S304). Specifically, when the up button 84 is operated with a first filename 172 displayed on the main screen 170, a second filename 172 is displayed on the main menu 170. By contrast, when the down button 86 is operated with the second filename 172 displayed on the main screen 170, the first filename 172 is displayed on the main menu 170.

In response to an operation of the Enter button 90 of the input interface 58 on the main menu 170 with a filename of the layout image (S310: YES), the CPU 52 allows the LCD 56 to display a content screen 180 corresponding to the selected layout image (refer to FIG. 3) (S314). As illustrated in FIG. 3, the content screen 180 displays one object 116 of the layout image selected on the main screen 170. In response to an operation of the left button 80 or the right button 82 of the input interface 58, an object 116 displayed on the content screen 180 is changed in accordance with the attribute table. The CPU 52 determines whether the left button 80 or the right button 82 has been operated (S316). In response to a determination that the left button 80 or the right button 82 has been operated (S316: YES), the CPU 52 changes the object 116 displayed on the content screen 180 in accordance with the order set in the attribute table (S318).

Figure 10:
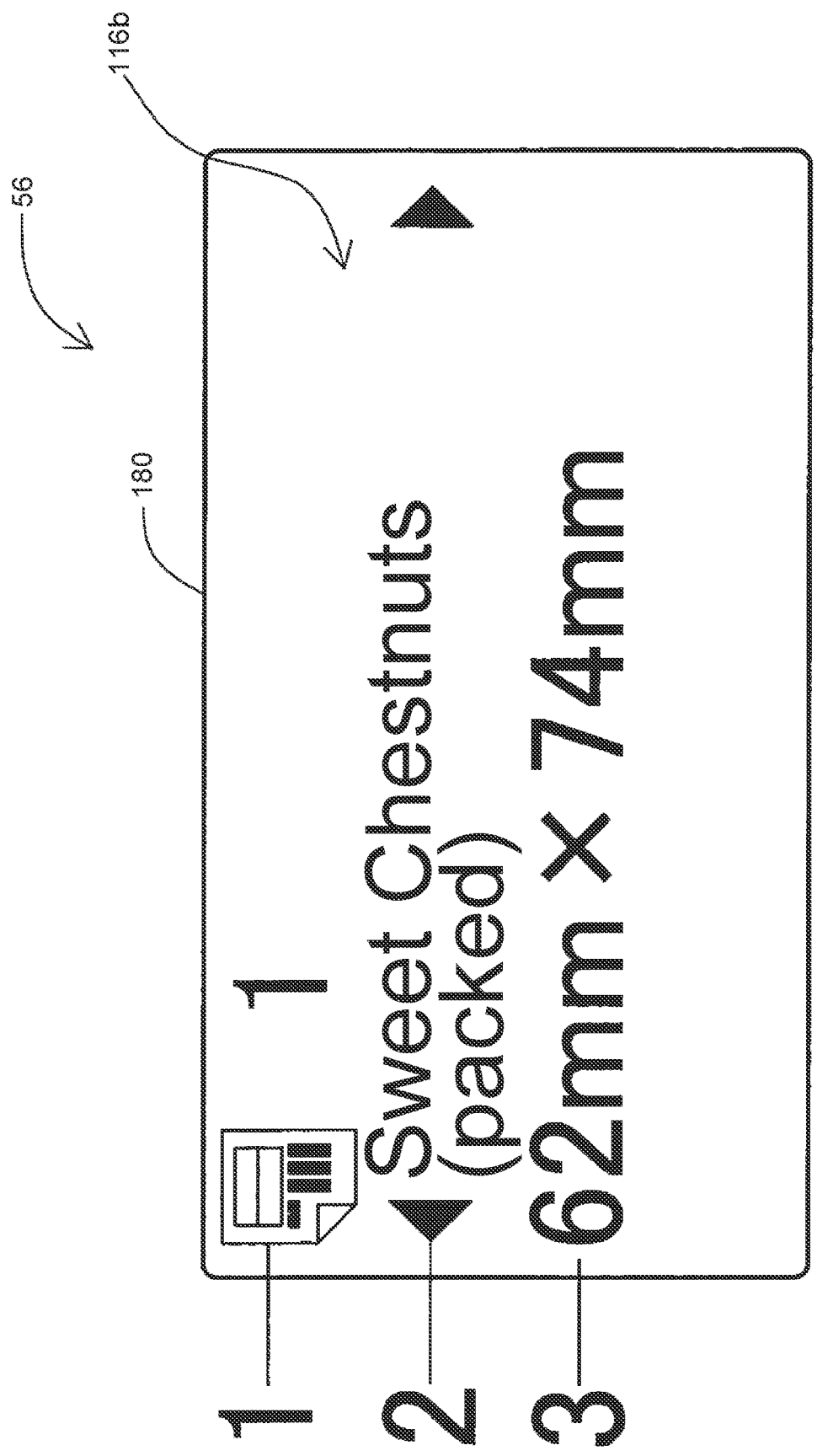
FIG. 10 illustrates a content screen.

Specifically, the CPU 52 refers to the attribute table sent from the PC 10 as well as the layout image selected on the main screen 170. When the right button 82 is operated, for example, the CPU 52 identifies the attribute ID given to the object 116 displayed on the content screen 180 and an attribute ID coming next in the order set in the attribute table (hereinafter referred to as a next ID). The CPU 52 allows the content screen 180 to display an object 116 corresponding to the next ID. Specifically, the registered attribute table has attribute IDs listed in the order displayed in the attribute list field 134 illustrated in FIG. 6, and the "Product name" object 116a is displayed on the content screen 180 as illustrated in FIG. 3. In this case, when the right button 82 is operated, the CPU 52 identifies the attribute ID "Title of Product name" as the attribute ID given to the "Product name" object 116a. The CPU 52 then identifies an attribute ID coming next to the attribute ID "Title of Product name" as the next ID by referring to the attribute table. The CPU 52 changes the object displayed on the content screen 180 from the "Product name" object 116a to the "Sweet Chestnuts (packed)" object 116b as illustrated in FIG. 10.

When the left button 80 is operated, for example, the CPU 52 identifies the attribute ID given to the object 116 displayed on the content screen 180 and an attribute ID preceding the attribute ID given to the object 116 in the order set in the attribute table (hereinafter referred to as the previous ID). The CPU 52 allows the content screen 180 to display an object 116 corresponding to the previous ID. Specifically, the registered attribute table has attribute IDs listed in the order displayed in the attribute list field 134 illustrated in FIG. 6, and the "Sweet Chestnuts (packed)" object 116b is displayed on the content screen 180 as illustrated in FIG. 10. In this case, when the left button 80 is operated, the CPU 52 identifies the attribute ID "Product name" as the attribute ID given to the "Sweet Chestnuts (packed)" object 116b. The CPU 52 then identifies the attribute ID preceding the attribute ID "Product name" as the previous ID by referring to the attribute table. Subsequently, the CPU 52 changes the object displayed on the content screen 180 from the "Sweet Chestnuts (packed)" object 116b to the "Product name" object 116a having the previous ID "Title of Product name", as illustrated in FIG. 3. The CPU 52 changes the object displayed on the content screen 180 in accordance with the attribute table in this manner.

Figure 11:
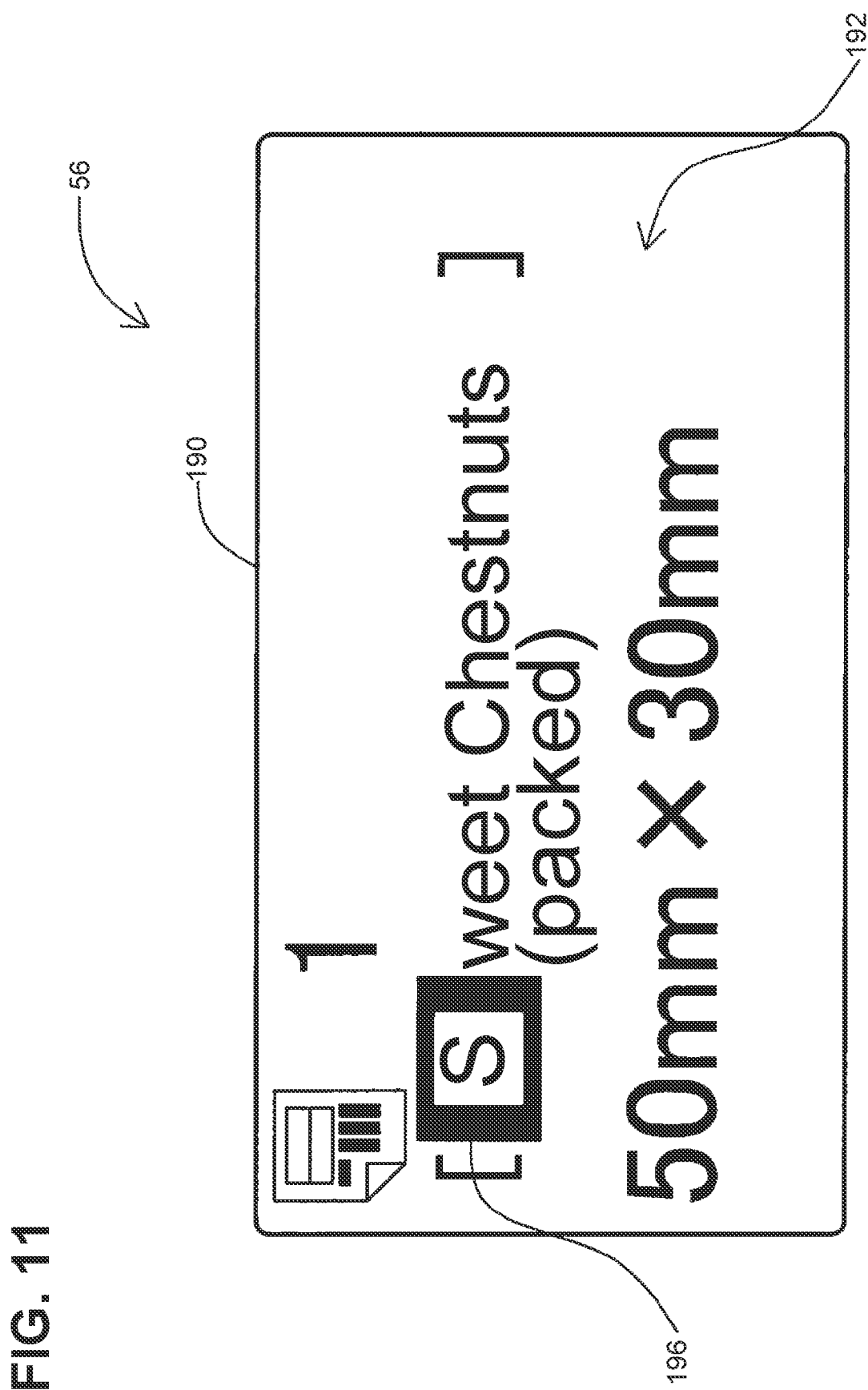
FIG. 11 illustrates an edit screen.

In response to an operation of the Back button 88 with the LCD 56 displaying the content screen 180 (S320: YES), the CPU 52 allows the LCD 56 to display the main screen 170 instead of the content screen 180 (S300). In response to an operation of the Enter button 90 with the LCD 56 displaying the content screen 180 (S322: YES), the CPU 52 allows the LCD 56 to display the edit screen 190 illustrated in FIG. 11 instead of the content screen 180 (S324).

The edit screen 190 displays the object 116 displayed on the content screen 180 with a cursor 196 where an edit is to be made. On this occasion, in response to an operation of the left button 80 or the right button 82 (S326: YES), the CPU 52 moves the cursor 196 to the left or right in accordance with the operated button (S328). When the CPU 52 accepts a text input with the edit screen 190 displayed on the LCD 56 (S330: YES), the CPU 52 allows the edit screen 190 to display an input character at a position where the cursor 196 sitting on the object 116 is displayed (S332). The object selected on the content screen 180 is edited in this manner.

In response to an operation of the Cancel button 96 with the LCD 56 displaying the edit screen 190 (S334: YES), the CPU 52 discards changes (S336), and allows the LCD 56 to display the content screen 180 instead of the edit screen 190 (S314).

In response to an operation of the Back button 88 with the LCD 56 displaying the edit screen 190 (S338: YES), the CPU 52 allows the LCD 56 to display the content screen 180 instead of the edit screen 190 (S314). In response to an operation of the Enter button 90 with the LCD 56 displaying the edit screen 190 (S340: YES), the CPU 52 saves image data of the layout image including edited objects in the data storage area 32 (S342).

In a state where the LCD 56 displays the main screen 170 (S300) after the completion of object editing or when no object editing is performed, in response to an operation of the Print button 92 (S306: YES), the CPU 52 activates the printer engine 51 to execute printing based on image data of the layout image including edited objects or image data of a layout image received from the PC 10 (S308).

During execution of the application 70, objects included in a layout image are displayed one by one on the content screen 180 in the order set in an attribute table. The attribute table is generated through the operations of the table generation screen 130 on the PC 10. The generated attribute table is applied through the operations of the table application screen 150 to a layout image created by a user. A single attribute table can be applied to multiple layout images. This lightens the workload of the user who would otherwise set a display changing order newly for every layout image to change objects to be displayed one by one on the content screen 180 on the printer 50.

Step S108 executed by the CPU 12 of the PC 10 is an example of an operation of generating image data. Step S102 executed by the CPU 12 of the PC 10 is an example of an operation of generating edit order data. Step S162 executed by the CPU 12 of the PC 10 is an example of an operation of receiving an input of a data name Step S201 executed by the CPU 12 of the PC 10 is an example of an operation of accepting a selection. Step S218 executed by the CPU 12 of the PC 10 is an example of an operation of sending image data and edit order data. Step S300 executed by the CPU 52 of the printer 50 is an example of an operation of receiving image data and edit order data. Step S308 executed by the CPU 52 of the printer 50 is an example of an operation of activating the printer engine to form the layout image based on the edited image data.

According to the above embodiment, the following effects are obtained.

The above embodiment describes that the CPU 12 of the PC 10 generates image data of a layout image and an attribute table. The layout image is an image where objects 116 are arranged and the attribute table is a table in which an attribute ID indicating an object is associated with an ordinal number in the display changing order. In the attribute table illustrated in FIG. 20, the attribute ID of "Title of Product name" (an example of "first attribute identification") is associated with "1", and the attribute ID of "Product name" (an example of "second attribute identification") is associated with "2". On the printer 50, the objects included in the layout image are edited in the display changing order set in the attribute table. For example, the "Product name" object 116*a* (an example of a "first object") may be edited before or after the "Sweet Chestnuts (packed)" object 116*b* (an example of a "second object"). The use of the attribute table is beneficial to editing of the objects.

The CPU 12 of the PC 10 sends the generated layout image and attribute table to the printer 50. On the printer 50, the CPU 52 refers to the attribute table to edit the objects. The objects can be thus edited in proper sequence.

On the printer 50, the objects to be edited are changed in the display changing order set in the attribute table. This enables the user to select an object to be edited.

On the printer 50, the operation of the right button 82 causes a change from an object to be edited included in the layout image to its next object, and the operation of the left button 80 causes a change from the object to its previous object. The objects to be edited can be thus changed in proper sequence.

On the printer 50, a layout image is selected from multiple layout images with the operations of the up and down buttons 84, 86. Editing of objects included in the selected layout image is performed based on an attribute table associated with the selected layout image. The use of the attribute table associated with the layout image is beneficial to editing of the objects.

On the PC 10, the objects 116 are arranged in positions in the label image 110 based on layout operations of objects associated with attribute IDs. The attribute table and the layout image can be thus associated with each other.

On the PC 10 having multiple attribute tables, an attribute table is selected from the attribute tables. The objects 116 are arranged in positions in the label image 110 based on layout operations of the objects associated with attribute IDs of the selected attribute table. An attribute table of the attribute tables can be thus associated with a layout image.

On the PC 10, the attribute table is generated based on text input by a user. This facilitates generating an attribute table. On the PC 10, a filename of the attribute table is created based on text input by the user. A filename is selected from filenames of the attribute tables, and a layout image is generated based on layout operations of objects associated with attribute IDs of an attribute table with the selected filename. The attribute table can be thus selected easily.

The disclosed herein is not limited to the above embodiment, and various modifications and improvements can be made on the basis of the knowledge of those skilled in the art.

In the above embodiment, the objects to be displayed on the LCD 56 of the printer 50 are changed in accordance with the display changing order included in the attribute table. In some embodiments, the objects to be edited may be changed in accordance with the display changing order. For example, the LCD 56 of the printer 50 may not display all the objects but may simultaneously display multiple objects, the objects may be arranged in the display changing order included in the attribute table, and the objects to be edited may be changed in the display changing order.

In the above embodiment, the objects are used for label printing. The objects may be used for printing on not only a label but also a different print medium.

The above embodiment describes process steps or operations illustrated in FIGS. 12 to 19 executed by the CPUs 12 and 52. The operations may be executed by not only the CPUs 12 and 52 but also an application-specific integrated circuit (ASIC) or a logic integrated circuit, or by cooperation of the CPUs, the ASIC, and the logic integrated circuit.

What is claimed is:

1. A communication system comprising an information processing apparatus and a printer,
   wherein the information processing apparatus includes a first user interface and a first controller, the first controller configured to:
   receive a layout instruction via the first user interface;
   generate image data representing a layout image, the layout image having a first object and a second object, the first object having a first attribute and the second object having a second attribute;
   generate edit order data indicating an edit order of the first object and the second object, the edit order data including a first attribute identification representing the first attribute and a second attribute identification representing the second attribute; and
   send the image data and the edit order data to the printer,
   wherein the printer includes a printer engine, a second user interface, and a second controller, the second controller configured to:
   receive the image data and the edit order data from the information processing apparatus;
   receive, via the second user interface, an edit instruction to edit the received image data;
   process editing of the image data in accordance with the received edit order data; and
   activate the printer engine to form the layout image based on the edited image data.

2. A non-transitory computer-readable storage medium storing instructions, wherein the instructions, when executed by a controller of an information processing apparatus, cause the information processing apparatus to perform operations comprising:
   receiving a layout instruction;
   generating image data representing a layout image, the layout image having a first object and a second object, the first object having a first attribute and the second object having a second attribute;
   generating edit order data indicating an edit order of the first object and the second object, the edit order data including a first attribute identification representing the first attribute and a second attribute identification representing the second attribute; and
   sending the image data and the edit order data.

3. The non-transitory computer-readable storage medium according to claim 2,
   wherein the generating the edit order data includes:
   associating the first attribute identification with a first ordinal number; and
   associating the second attribute identification with a second ordinal number, and
   wherein the edit order data to be sent includes set of the first ordinal number and the first attribute identification, and set of the second ordinal number and the second attribute identification.

4. The non-transitory computer-readable storage medium according to claim 2,
wherein the generating the image data includes receiving layout operation to arrange each of the first object and the second object in positions of the layout image.

5. The non-transitory computer-readable storage medium according to claim 4,
wherein the edit order data includes a plurality of edit order data pieces,
wherein the operations further comprise:
receiving a selection of an edit order data piece of the plurality of edit order data pieces, and
wherein the generating image data includes generating the image data in accordance with the selected edit order data piece.

6. The non-transitory computer-readable storage medium according to claim 2, wherein the generating the edit order data includes:
receiving an input of a first text representing the first attribute identification; and
receiving an input of a second text representing the second attribute identification, and
wherein the edit order data includes the first attribute identification represented by first text data corresponding to the first text and the second attribute identification represented by second text data corresponding to the second text.

7. The non-transitory computer-readable storage medium according to claim 6,
wherein the generating the edit order data including receiving an input of a data name of the edit order data, and
wherein the edit order data includes the input data name.

8. The non-transitory computer-readable storage medium according to claim 7,
wherein the edit order data includes a plurality of edit order data pieces, and the text data includes a plurality of data names of the plurality of edit order data pieces,
wherein the operations further comprise:
receiving a selection of a data name of the plurality of data names, and
wherein the generating image data includes generating the image data in accordance with an edit order data piece having the selected data name.

9. A printer comprising:
a printer engine;
a user interface;
a communication interface; and
a controller configured to:
receive, via the communication interface, image data representing a layout image, the layout image having a first object and a second object, the first object having a first attribute and the second object having a second attribute;
receive, via the communication interface, edit order data indicating an edit order of the first object and the second object, the edit order data including a first attribute identification representing the first attribute and a second attribute identification representing the second attribute;
receive, via the user interface, an edit instruction to edit the received image data;
process editing of the image data in accordance with the received edit order data; and
activate the printer engine to form the layout image based on the edited image data.

10. The printer according to claim 9,
wherein the printer further includes a display for displaying each of the first object and the second object, and
wherein the controller further configured to:
display the first object on the display for editing the first object;
receive, via the user interface, change instruction for changing edit target object from the first object to the second object; and
display the second object on the display for editing the second object.

11. The printer according to claim 10,
wherein the user interface includes a first operation button and a second operation button,
wherein the layout image has a plurality of objects including the first object and the second object,
wherein the first operation button is for switching the plurality of objects one after another such that each of the plurality of objects is switched to an immediately preceding object of the plurality of objects, and
wherein the second operation button is for switching the plurality of objects one after another such that each of the plurality of objects is switched to an immediately following object of the plurality of objects.

12. The printer according to claim 11,
wherein the controller is configured to receive a plurality of image data,
wherein the controller is further configured to receive a selection of image data from the plurality of image data, and
wherein the controller is configured to edit the selected image data.

* * * * *